(12) United States Patent
Bratkovski et al.

(10) Patent No.: US 8,017,239 B2
(45) Date of Patent: Sep. 13, 2011

(54) METAMATERIALS AND METHODS OF MAKING THE SAME

(75) Inventors: Alexandre M. Bratkovski, Palo Alto, CA (US); R. Stanley Williams, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1203 days.

(21) Appl. No.: 11/395,698

(22) Filed: Mar. 31, 2006

(65) Prior Publication Data

US 2007/0232738 A1    Oct. 4, 2007

(51) Int. Cl.
*B32B 9/00* (2006.01)
(52) U.S. Cl. ........................................ 428/408; 977/742
(58) Field of Classification Search .................. 428/408; 423/447.1, 445 R; 977/742
See application file for complete search history.

(56) References Cited

U.S. PATENT DOCUMENTS

| | | | |
|---|---|---|---|
| 5,444,811 A | | 8/1995 | Yoshimura et al. |
| 5,648,056 A | * | 7/1997 | Tanaka ...................... 423/445 B |
| 2003/0183811 A1 | | 10/2003 | Uesaka et al. |
| 2003/0210716 A1 | | 11/2003 | Sakata et al. |
| 2004/0009346 A1 | * | 1/2004 | Jang et al. ..................... 428/336 |
| 2004/0204513 A1 | | 10/2004 | Takizawa et al. |
| 2005/0156147 A1 | | 7/2005 | Akiba et al. |

FOREIGN PATENT DOCUMENTS

| EP | 0637774 | | 2/1995 |
|---|---|---|---|
| WO | WO2005/018012 | * | 2/2005 |

OTHER PUBLICATIONS

Jung et al., "Circuit Fabrication at 17 nm Half-Pitch by Nanoimprint Lithography", Nano Letters, 2006, vol. 6, No. 3, pp. 351-354.
Chen et al., "Nanoscale Molecular-Switch Crossbar Circuits", Nanotechnology 14 (2003), pp. 462-468.
S O'Brien et al-"Near-infrared photonic band gaps and nonlinear effects in neagative magnetic metamaterials"—Physical Review B—vol. 69 vol. 24—Jun. 15, 2004—pp. 241101-1/4.
A A Zharov et al-"Nonlinear properties of left-handed metamaterials"—Physical Review Letters APS vol. 91 No. 3—Jul. 18, 2003 pp. 3356-3358.
V M Shalaev et al-"Negative Index of Refraction in Optical Metamaterials"—Optics Letters—vol. 30 No. 4—Dec. 15, 2005— pp. 3356-3358.
S Maci et al-"Dispersion analysis of printed periodic structures by using a pole-zero network synthesis"—ICECOM 2003—Oct. 2003—pp. 300-303.

* cited by examiner

*Primary Examiner* — David Sample
*Assistant Examiner* — Daniel Miller

(57) ABSTRACT

A metamaterial includes a non-linear organic material and a plurality of metallic resonators embedded substantially within the non-linear organic material.

20 Claims, 4 Drawing Sheets

METAMATERIALS AND METHODS OF MAKING THE SAME

BACKGROUND

The present disclosure relates generally to metamaterials and methods of making the same.

It has been found that a large non-linear optical response may be achieved in some inorganic materials. The non-linear characteristics of such materials, may, however, have relatively small values. Furthermore, the manufacturing of such materials may be relatively costly and complex. Still further, with inorganic materials, it may be difficult to achieve a desirable combination of larger values of non-linear characteristics, desirable values of negative refractive indices, and the ability to produce flexible and relatively inexpensive structures.

As such, it would be desirable to provide a material having relatively large values of non-linear optical properties, that is capable of forming flexible structures and offers the possibility of engineering a desirable negative index of refraction at a particular frequency that may have a higher harmonic when compared to incident light.

SUMMARY

A metamaterial includes a non-linear organic material and a plurality of metallic resonators embedded substantially within the non-linear organic material.

BRIEF DESCRIPTION OF THE DRAWINGS

Features and advantages of the present disclosure will become apparent by reference to the following detailed description and drawings, in which like reference numerals correspond to similar, though not necessarily identical components. For the sake of brevity, reference numerals or features having a previously described function may not necessarily be described in connection with other drawings in which they appear.

DETAILED DESCRIPTION

Figure 1:
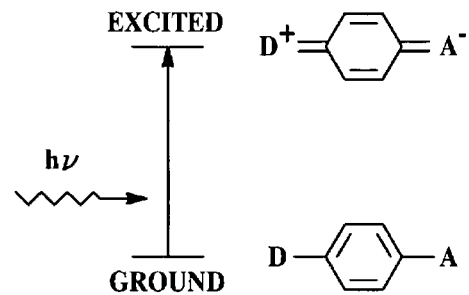
FIG. 1 is a schematic diagram of a generic example of an organic molecule having an electron-donating/electron-accepting pair switching between ground and excited states.

Generally, embodiments of the metamaterial disclosed herein include metallic resonators/inclusions in contact with a non-linear organic material. The combination of resonators and non-linear organic material advantageously produces negative refractive index metamaterials having substantially high non-linear characteristics.

Embodiments of the metamaterial are suitable for use in a variety of devices. Non-limitative examples of such devices include flexible structures, optical devices (e.g., single photon devices), directional couplers, non-linear Fabry-Perot interferometers in flexible media, direct optical and electrooptical modulators, or the like. Embodiments of the metamaterial are also suitable for use in a variety of applications. Non-limitative examples of such applications include light control, light processing, optical communications and storage, information processing, stimulated Raman spectroscopy, or the like. Furthermore, it is believed that the metamaterials may advantageously facilitate substantially efficient frequency multiplication (upconversion), optical bistability, spatial wave modulation, or combinations thereof.

In an embodiment, the metamaterial includes the non-linear organic material and a plurality of metallic resonators embedded substantially within the organic material. The term "substantially embedded within" as used herein means that the metallic resonators are at least partially surrounded by the organic material. In one embodiment, the metallic resonators may be completely surrounded by the organic material.

Without being bound to any theory, it is believed that the physical mechanism for achieving the nonlinear response in the organic material is related to the electron distribution (i.e., charge separation) in the optical field. The dipole moment in the external field (E) is defined by the following equation:

$$\mu(E) = \mu_0 + \alpha E + \tfrac{1}{2}\beta E^2 + \tfrac{1}{6}\gamma E^3 \quad \text{(Eqn. 1)}$$

where $\mu_0$ is the constant molecular dipole, $\alpha$ is the usual polarizability, and $\beta$ and $\gamma$ are the first and second hyperpolarizabilities. The field intensity of a medium with a refractive index "n" in a laser field with energy density "u" is characterized by the following equation:

$$E = (1/n)\sqrt{(2u/\epsilon_0)} \quad \text{(Eqn. 2)}$$

where $\epsilon_0$ is the permittivity of a vacuum. With a common refractive index of 1.6 and an energy density of 1 J/cm$^3$, the field intensity is $3 \cdot 10^6$ V/cm. Generally, the hyperpolarizability $\beta$ is larger in systems with a large difference $\Delta\mu$ of dipole moments between the ground and excited states, as depicted by the following equation:

$$\beta \propto \Delta\mu |\mu_{ge}|^2 / E_g^2 \quad \text{(Eqn. 3)}$$

where $\mu_{ge}$ is the matrix element of the dipole moment between the ground and excited states and $E_g$ is the gap between the states.

In systems including electron-donor (D)—electron-acceptor (A) pairs separated by a molecule capable of forming a conjugated π-bridge between the pair, the optical transition may be accompanied by the transfer of an electron from the donor (D) to the acceptor (A). The transfer of the electron forms a D$^+$-π-A$^-$ pair with a large difference in dipole moments of the ground and excited states.

A non-limitative example of the transfer of an electron from the electron-donor (D) to the electron-acceptor (A) as the molecular system switches between its ground and excited states is shown in FIG. 1.

As depicted, the molecular system includes a molecule (a non-limitative example of which is the benzene ring in FIG. 1) that is capable of forming a conjugated π-bridge, an electron-donor (D) and an electron-acceptor (A). The molecular system is fully conjugated in the excited state, and is comparatively more electrically conductive. Thus, the π-electrons and the non-bonding electrons of the molecular system, through its highest occupied molecular orbital (HOMO) and lowest unoccupied molecular orbital (LUMO), are delocalized over substantially the entire system. Conversely, in the ground state, the conjugation of the molecular system is broken, and is comparatively less electrically conductive. In the ground state, the HOMO and LUMO are no longer delocalized over the entire molecular system.

Figure 2:
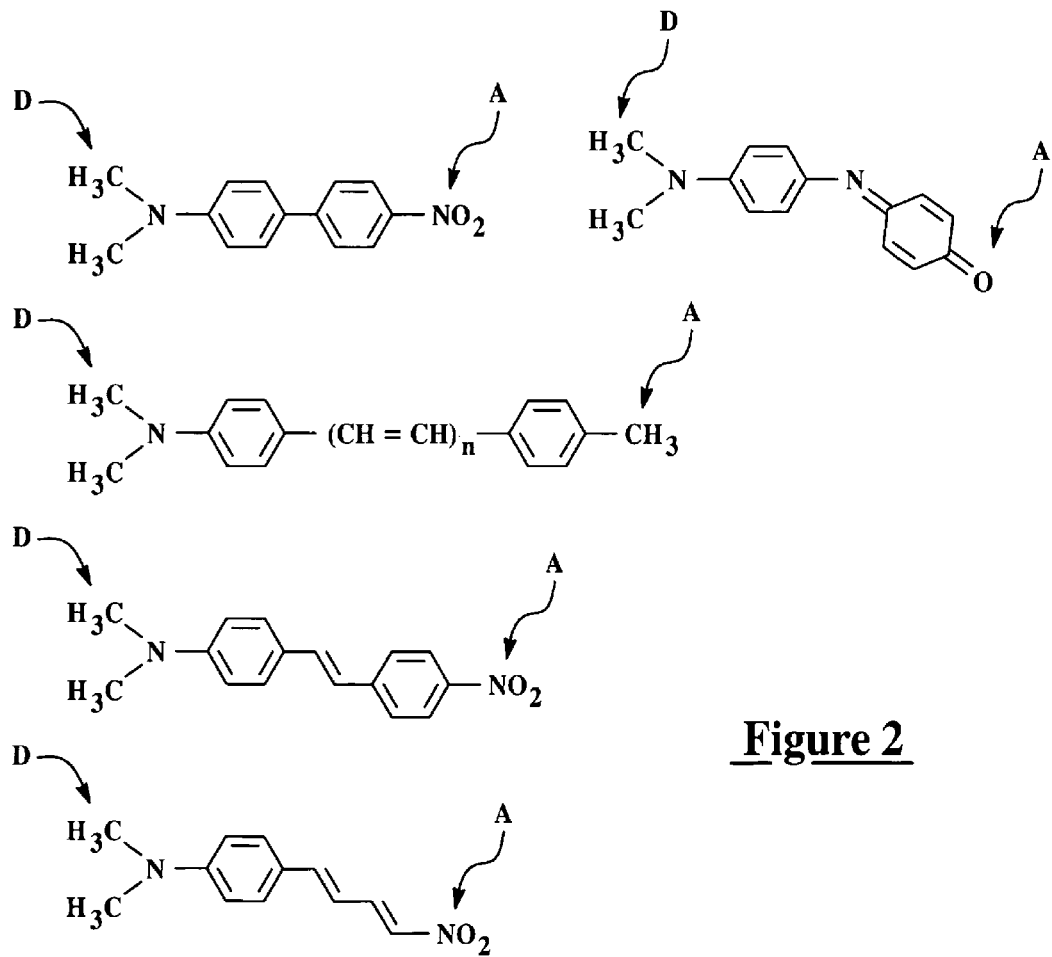
FIG. 2 is a schematic diagram of examples of organic molecules having an electron-donating/electron-accepting pair.

Some non-limitative examples of non-linear organic materials having molecular systems (D-π-A) suitable for use in embodiments of the metamaterials are depicted in FIG. 2.

In other embodiments of the metamaterial, the non-linear organic material includes an electron-acceptor (also referred to herein as an electron-accepting molecule) in an electron-donating polymer. In still another embodiment, the non-linear organic material includes an electron-donor (also referred to herein as an electron-donating molecule) in an electron-accepting polymer.

Non-limitative examples of electron-acceptors (A) include benzene with two $NO_2$ moieties, p-chloranile, 2,4,7-trinitrofluorenone (TNF), fullerene buckyballs, carbon nanotube fragments, poly(cyanoether phenylenevinylene) (PCNEPV), or combinations thereof.

Non-limitative examples of electron-donors include poly (2,5-dimethoxy-1,4-phenylene vinylene) (DMPPV), poly(N-vinylcarbazole) (PVK), poly[2-methoxy-5-(3',7'-dimethyloctyloxy)-1,4-phenylene vinylene] (MDMO-PPV), or combinations thereof.

Figure 3:
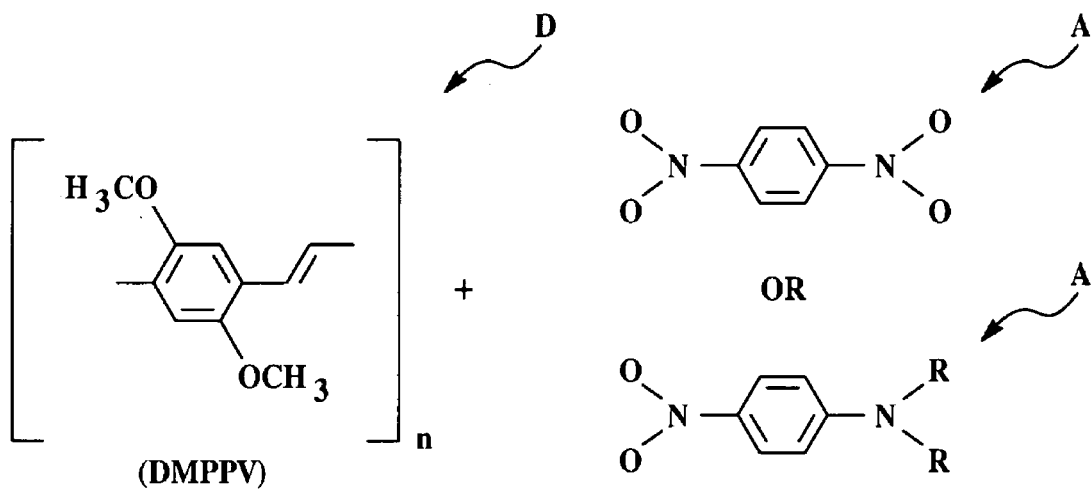
FIG. 3 is a schematic diagram of an example of an electron-donating polymer with different electron-accepting molecules.
Figure 4:
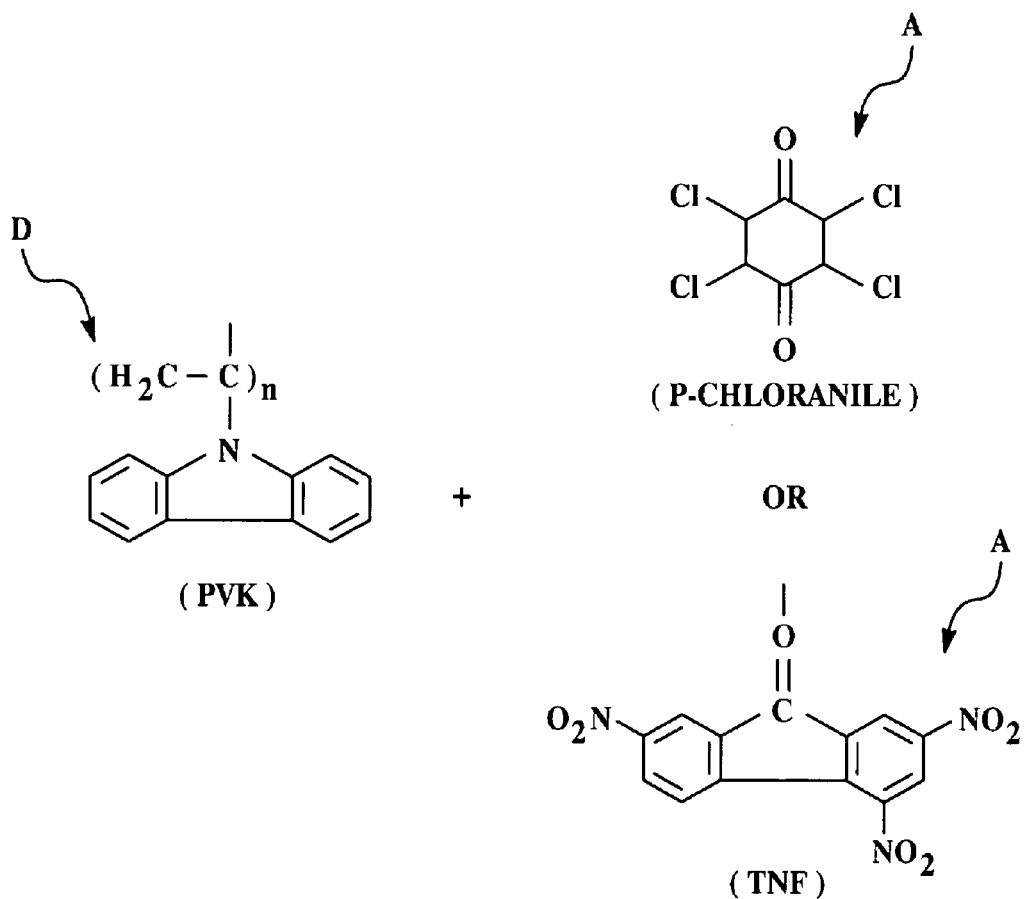
FIG. 4 is a schematic diagram of another example of an electron-donating polymer with different electron-accepting molecules.

FIGS. 3 and 4 depict different electron-donating polymers D that may be mixed with different electron-accepting molecules A to form an organic material 12 suitable for use in the embodiments disclosed herein. In the non-limitative example shown in FIG. 3, the electron-donating polymer D is DMPPV, and the electron accepting molecules A may be benzene with two $NO_2$ moieties or benzene with one $NO_2$ moiety and one $NR_2$ moiety. In the non-limitative example shown in FIG. 4, the electron-donating polymer D is PVK, and the electron accepting molecules A may be p-chloranile or TNF.

The non-linear organic materials may also be modified via molecular doping, the addition of organic and/or inorganic fillers, or the like, or combinations thereof.

Embodiments of the metamaterial also include a plurality of metallic resonators. Equation 1 (above) indicates that non-linearity increases with field intensity. Without being bound to any theory, it is believed that non-linearity may be locally amplified by orders of magnitude by placing the metallic resonators in contact with the non-linear organic material. The metallic resonators may have large aspect ratios and may work as a field concentrator at their ends. Non-limitative examples of metallic resonators include metallic split-ring resonators, carbon nanotubes, metallic nanoparticles, metallic nanowires, fullerenes, or combinations thereof.

Figure 5:
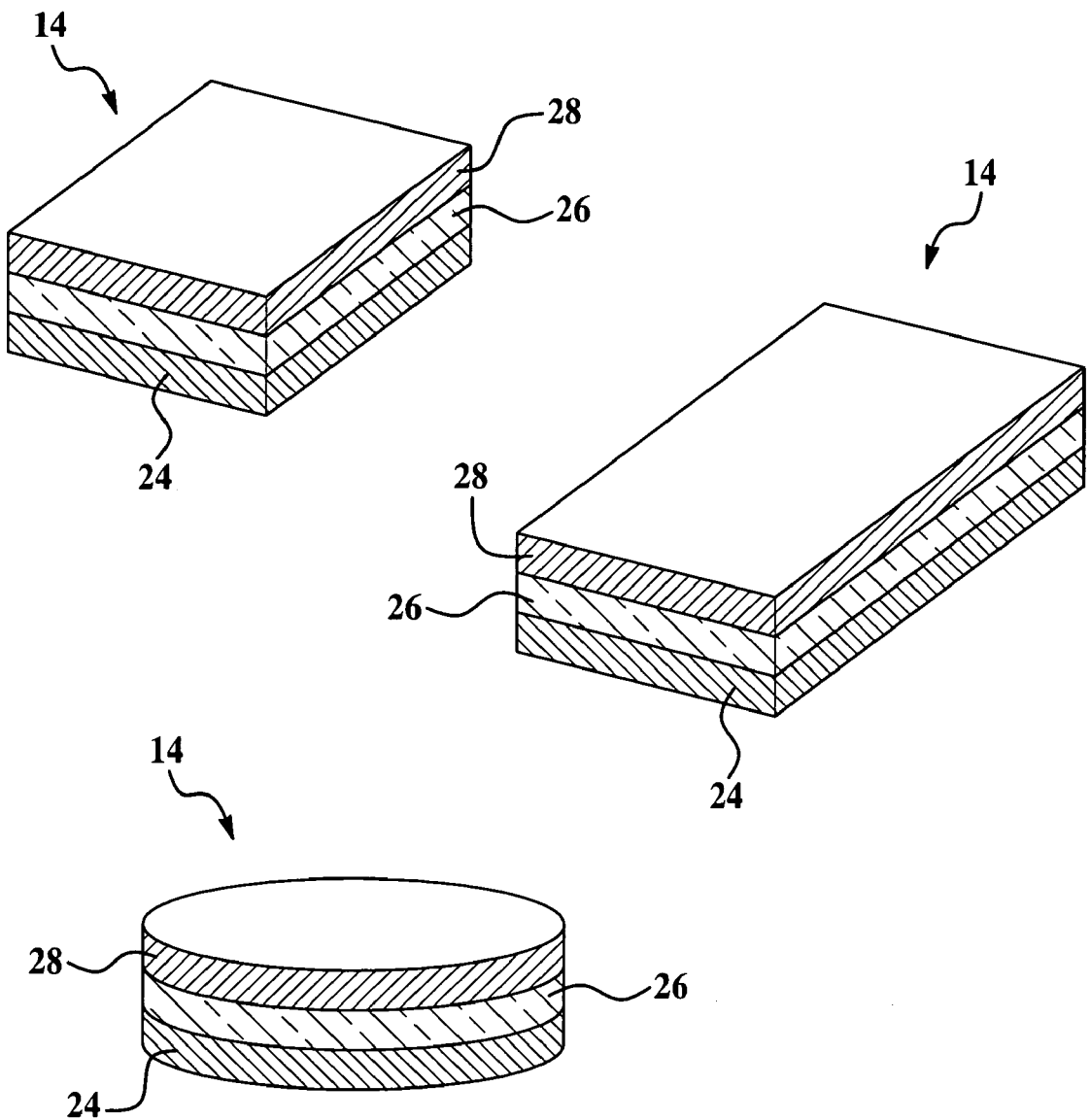
FIG. 5 is a schematic perspective view of different metal-insulator-metal resonators.

Additionally, the metallic resonators 14 may be metal layer 24—insulator layer 26—metal layer 28 "sandwiches" formed via nanoimprinting. Non-limitative examples of such resonators 14 are shown in FIG. 5. Non-limitative examples of metal layers 24, 28 include silver, silicon, gold, alloys thereof, or the like, or combinations thereof. Non-limitative examples of the insulator layer 26 include silicon dioxide, undoped silicon, galium arsenide, silicon carbide, magnesium oxide, or the like, or combinations thereof. Some specific examples of the metal layer 24—insulator layer 26—metal layer 28 sandwiches include, but are not limited to Ag—$SiO_2$—Si, Au—$SiO_2$—Au, Ag—Si—Ag, Ag—GaAs—Ag, Ag—SiC—Ag, Ag—MgO—Ag, Au—$SiO_2$—Si, Au—Si—Au, Au—GaAs—Au, Au—SiC—Au, Au—MgO—Au, or the like. The metal-insulator-metal resonators 14 may have any suitable size, shape, geometry, configuration, or combinations thereof. Some non-limitative examples of suitable shapes include squares, rectangles (e.g., a bar-like shape), ovals, circles, or the like. The metal-insulator-metal resonators 14 generally have a length or diameter less than about 400 nm, and in some instances, the length or diameter is less than about 300 nm. Furthermore, the metal-insulator-metal resonators 14 generally have a height ranging from about 30 nm to about 60 nm.

Taking into consideration the effect of an imposed AC magnetic field, the magnetic response of metallic split-ring resonators can be illustrated. An electromotive force V is developed around a loop proportional to the enclosed flux, or $$V = -i\omega BA \qquad \text{(Eqn. 4)}$$

where B is the magnetic field perpendicular to the axis of the ring, w is the frequency, and A is the surface area. Current (I) will flow proportional to the impedance (Z) of the circuit because of the applied electromagnetic field. The impedance may be defined by the following equation:

$$Z = R + i\omega L + 1/i\omega C \qquad \text{(Eqn. 5),}$$

so that the current that flows in the loop is defined by:

$$I = V/Z = -i\omega BA/(R + i\omega L + 1/i\omega C) \qquad \text{(Eqn. 6)}$$

where R is resistance, C is capacitance, and L is inductance. Using the definition that the magnetic moment m=IA, and that permeability is μ=1+m/B, the permeability of a metallic split-ring resonator is defined by the following equation:

$$\mu = 1 - \frac{F\omega^2}{\omega^2 - \omega_0^2 - i\omega\Gamma} \qquad \text{(Eqn. 7)}$$

where $\omega_0$ is the usual LC resonance, and ⌈ is a damping parameter related to the resistive losses. F is the packing fraction of resonators in the matrix (i.e., the relative volume occupied) whose value is related to the overall geometry of the collective medium (e.g., unit cell size), in addition to the specific geometry of the unit cell.

Figure 6:
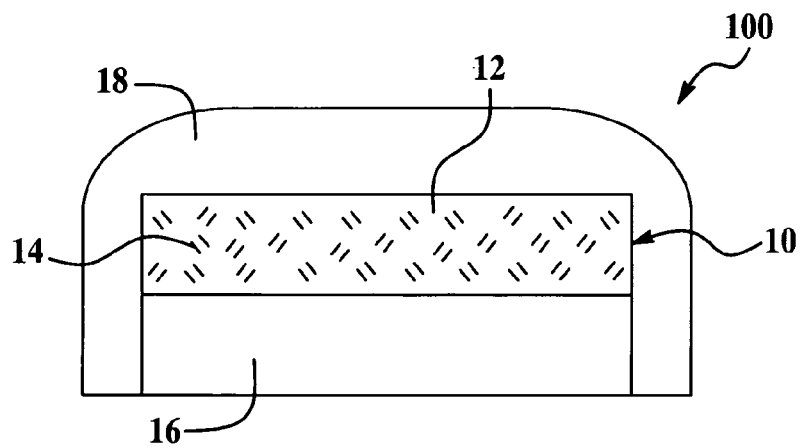
FIG. 6 is a schematic cross-sectional view of an embodiment of an optical device including an embodiment of a metamaterial.

Referring now to FIG. 6, an embodiment of an optical device 100 incorporating the metamaterial 10 therein is depicted. The metamaterial 10 includes the non-linear organic material 12 and the metallic resonators 14 embedded therein. It is to be understood that the metallic resonators 14 may be substantially uniformly or randomly dispersed throughout the non-linear organic material 12.

In the embodiment shown in FIG. 6, the metallic resonators 14 may be embedded into the organic material 12 via synthetic methods. The metamaterial 10 may then be established on the surface of a substrate 16 via nanoimprinting. Non-limitative examples of suitable substrates include transparent substrates, such as $Al_2O_3$, $SiO_2$, MgO, undoped Si (intrinsic silicon (i-Si)), other oxides, SiC, or combinations thereof.

The optical device 100 may also include a seal 18. The seal 18 may be formed using glass packaging, polymer packaging, or combinations thereof. The seal 18 substantially protects the device 100, and in particular, substantially protects the organic material 12 from photooxidation and degradation.

One synthetic method that may be used to substantially embed the metallic resonators 14 in the organic material 12 includes stacking the materials 12, 14, and performing mechanical adhesion between the materials 12, 14. Stacking may be accomplished by multiple nanoimprinting processes. It is to be understood that nanoimprinting allows the resonators 14 to be aligned as desired.

Another synthetic method for substantially embedding the metallic resonators 14 includes dispersing the resonators 14 in the organic material 12 in a molten state and solidifying the material. Generally, this results in a material 10 having substantially uniformly or randomly dispersed resonators 14 that are not specifically aligned.

In another embodiment, a first layer of a non-linear organic material 12 may be established on the substrate 16. The plurality of metallic resonators 14 may be printed on the first layer. It is to be understood that any suitable printing process may be used, a non-limitative example of which includes nanoimprinting. Nanoimprinting is generally described in an article by Chen et al., entitled "Nanoscale Molecular-Switch Crossbar Circuits" and published in 2003 in *Nanotech.*, 14, at page 462; and an article by Jung et al., entitled "Circuit Fabrication at 17 nm Half-Pitch by Nanoimprint Lithography" and published in 2006 in *Nano Lett.*, 6 (3), at pages 351-354.

A second layer of the non-linear organic material 12 may be established on the resonators 14 and any exposed portions of the first layer. The resulting metamaterial 10 has the plurality of metallic resonators 14 embedded within the non-linear organic material 12.

Figure 7:
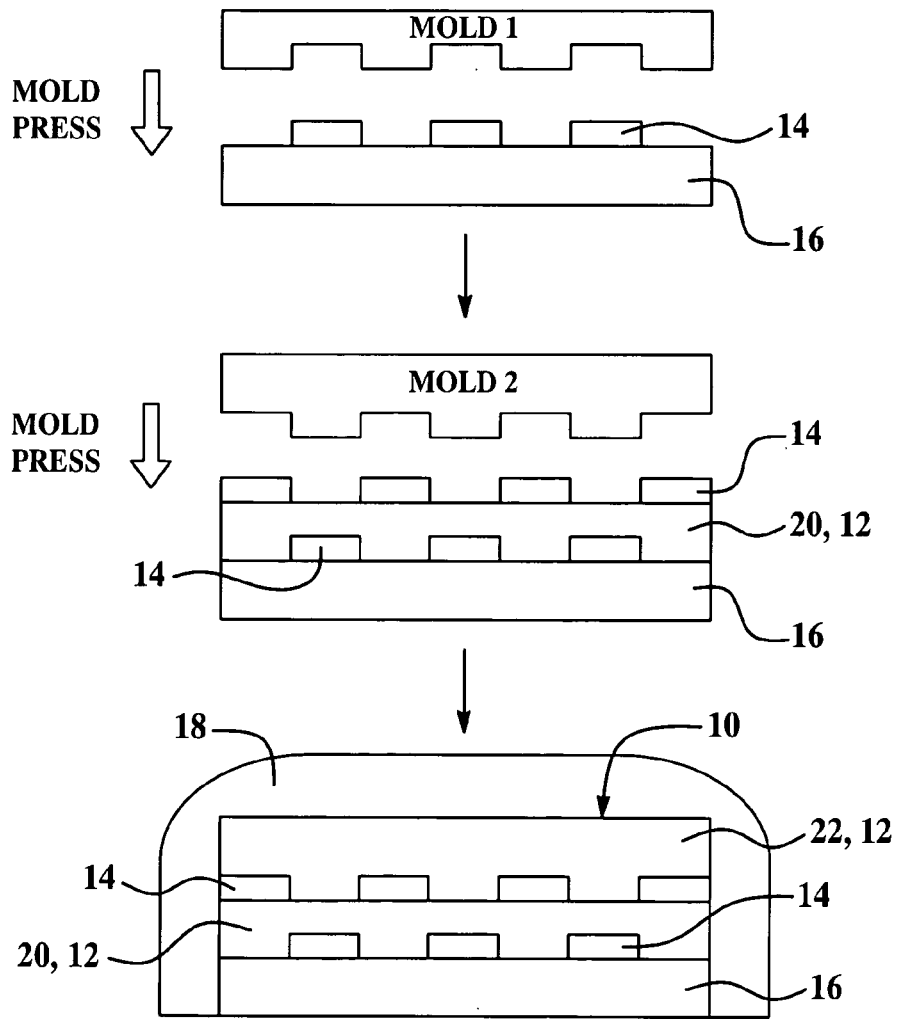
FIG. 7 is a schematic cross sectional view of an embodiment of forming an embodiment of an optical device including an embodiment of a metamaterial.

Referring now to FIG. 7, another embodiment for forming an embodiment of the optical device 100 is depicted. In this embodiment, rather than forming the metamaterial 10 and then establishing it on the substrate 16 (as shown in FIG. 6), the metamaterial 10 is formed as its components (the non-linear organic materials 12 and the metallic resonators 14) are established on the substrate 16.

As shown in FIG. 7, at least one of the plurality of metallic resonators 14 is established on the substrate 16. A first layer 20 of the non-linear organic material 12 is established on the metallic resonator(s) 14 and on exposed areas of the substrate 16. At least another of the metallic resonator(s) 14 is established on the first layer 20 of the non-linear organic material 12. Then, a second layer 22 of the non-linear organic material 12 is established on the other metallic resonator(s) 14 and on exposed areas of the first layer 20 of the non-linear organic material 12.

In this embodiment, the metallic resonators 14 may be established via e-beam lithography or nanoimprint lithography. The first and second layers 20, 22 of the non-linear organic material 12 may be established via spin coating.

As depicted, this embodiment of the optical device 100 may include a seal 18 (e.g., glass packaging, polymer packaging, or the like) substantially surrounding the metamaterial 10.

It is to be understood that the metamaterials 10 disclosed herein may resonate at IR or optical frequencies. Furthermore, the metamaterial 10 may combine a positive effective refraction at some frequency ($\omega$) with a negative effective refraction at another frequency (e.g., $2\omega$ or $3\omega$). Other embodiments of the metamaterial 10 may have a negative effective refraction at $\omega$, a positive effective refraction at $2\omega$, and a positive refraction at $3\omega$. The plurality of resonators 14 produces a relatively strong local field and facilitates upconversion of incident light with a frequency of $\omega$ to $2\omega$ and $3\omega$. It is to be understood that the metamaterial 10 may be designed to have a negative index of refraction at least one of the frequencies (as previously described, for example, at $\omega$, $2\omega$, or $3\omega$). It is to be further understood that any combination of index of refraction (i.e., positive or negative) and frequency (e.g., $\omega$, $2\omega$, $3\omega$, etc.) may be achieved; and such a combination may depend, at least in part, on the application in which the material 10 is used. It is believed that the ability to alter the refraction of the metamaterial 10 at various frequencies enables substantially unprecedented control over light diffraction when the materials 10 are used.

The metamaterials 10 described herein may also advantageously have a negative permittivity and a negative permeability ($\epsilon<0$ and $\mu<0$), a negative permittivity and a positive permeability ($\epsilon<0$ and $\mu>0$), or a positive permittivity and a negative permeability ($\epsilon>0$ and $\mu<0$).

The metamaterials 10 having negative permittivity and a negative permeability ($\epsilon<0$ and $\mu<0$) may advantageously be used for near-field superlensing (i.e., for focusing features much smaller than the wavelength). Experiments have shown that the strong magnetic resonance of the metallic resonators 14 leads to an effective negative permeability; and that negative permittivity may be realized by a natural photon-polariton resonance of semiconductors or by designing plasmonic wire/nanobar structures. Negative permittivity may also be realized by metallic photonic crystals with a certain dispersion of excitations (i.e., light dispersion inside the crystal). The previously mentioned nanoimprinting and deposition techniques may be used to fabricate the optical negative effective refractive index metamaterial 10 by stacking the two materials so the negative permittivity and permeability overlap at a desired wavelength range.

While several embodiments have been described in detail, it will be apparent to those skilled in the art that the disclosed embodiments may be modified. Therefore, the foregoing description is to be considered exemplary rather than limiting.

What is claimed is:
1. A metamaterial, comprising:
a non-linear organic material including a molecular system selected from:

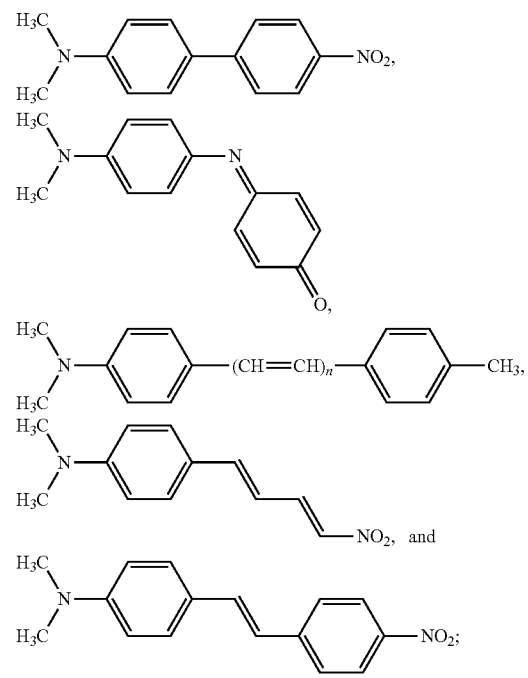

and
a plurality of metallic resonators embedded substantially within the non-linear organic material.
2. The metamaterial as defined in claim 1 wherein the plurality of metallic resonators is selected from metallic split-ring resonators, carbon nanotubes, metallic nanoparticles, metallic nanowires, fullerenes, metal-insulator-metal resonators, and combinations thereof.

3. The metamaterial as defined in claim 1 wherein the metamaterial has at least one of a negative effective refractive index, negative permittivity, negative permeability, or combinations thereof.

4. A method of making an optical device, comprising:
forming a metamaterial of a non-linear organic material and a plurality of metallic resonators substantially embedded within the non-linear organic material, the non-linear organic material including i) a molecular system selected from:

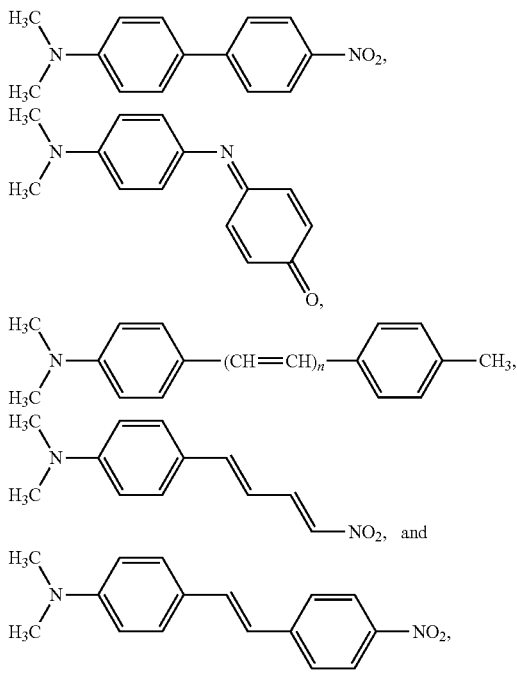

or ii) an electron-accepting molecule in an electron-donating polymer matrix, wherein the electron-accepting molecule is chosen from benzene with two $NO_2$ moieties, p-chloranile, 2,4,7-trinitrofluorenone, poly(cyanoether phenylenevinylene), and combinations thereof, and wherein the electron-donating polymer matrix is chosen from poly(2,5-dimethoxy-1,4-phenylene vinylene (DMPPV), poly(N-vinylcarbazole) (PVK), poly[2-methoxy-5-(3',7'-dimethyloctyloxy)-1,4-phenylene vinylene] (MDMO-PPV), and combinations thereof; and
establishing the metamaterial on a substrate surface.

5. The method as defined in claim 4 wherein forming the metamaterial is accomplished by embedding the plurality of metallic resonators in the non-linear organic material via synthetic methods.

6. The method as defined in claim 4 wherein forming the metamaterial is accomplished by:
printing the plurality of metallic resonators on the non-linear organic material; and
establishing a second non-linear organic material on the plurality of metallic resonators.

7. The method as defined in claim 4 wherein forming and establishing are performed substantially simultaneously, and are accomplished by:
establishing at least one of the plurality of metallic resonators on the substrate surface;
establishing the non-linear organic material on the at least one of the plurality of metallic resonators and on exposed areas of the substrate;
establishing at least one other of the plurality of metallic resonators on the non-linear organic material; and
establishing an other non-linear organic material on the at least one of the plurality of other metallic resonators and on exposed areas of the non-linear organic material.

8. The method as defined in claim 7 wherein establishing at least one of the at least one of the plurality of metallic resonators and the at least one other of the plurality of metallic resonators is accomplished via at least one of e-beam lithography or nanoimprint lithography.

9. The method as defined in claim 7 wherein establishing at least one of the non-linear organic material and the other non-linear organic material is accomplished by spin coating.

10. The method as defined in claim 4 wherein establishing the metamaterial on the substrate is accomplished by nanoimprinting.

11. The method as defined in claim 4 wherein the plurality of metallic resonators is substantially uniformly dispersed throughout the non-linear organic material.

12. The method as defined in claim 4, further comprising sealing the optical device.

13. The method as defined in claim 12 wherein sealing is accomplished with glass packaging, polymer packaging, or combinations thereof.

14. A metamaterial, comprising:
a non-linear organic material including i) a molecular system selected from:

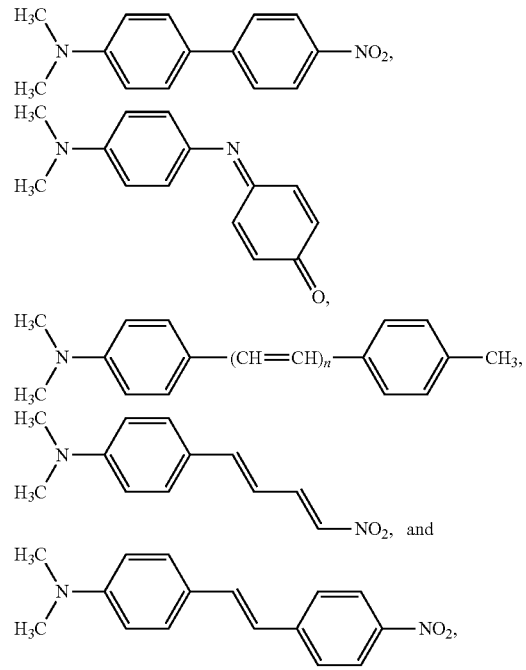

or ii) an electron-accepting molecule in an electron-donating polymer matrix, the electron-accepting molecule chosen from benzene with two $NO_2$ moieties, p-chloranile, 2,4,7-trinitrofluorenone, poly(cyanoether phenylenevinylene), and combinations thereof and the electron-donating polymer matrix chosen from poly(2,5-dimethoxy-1,4-phenylene vinylene (DMPPV), poly(N-vinylcarbazole) (PVK), poly[2-methoxy-5-(3',7'-dimethyloctyloxy)-1,4-phenylene vinylene] (MDMO-PPV), and combinations thereof; and
a plurality of metallic resonators embedded substantially within the non-linear organic material.

15. The optical device as defined in claim 14 wherein the plurality of metallic resonators is selected from metallic split-ring resonators, carbon nanotubes, metallic nanoparticles, metallic nanowires, fullerenes, metal-insulator-metal resonators, and combinations thereof.

16. The optical device as defined in claim 14 wherein the metamaterial has at least one of a negative effective refractive index, negative permittivity, negative permeability, or combinations thereof.

17. The optical device as defined in claim 14, further comprising a seal substantially surrounding the metamaterial.

18. The metamaterial as defined in claim 14 wherein the non-linear organic material is the electron-accepting molecule in the electron-donating polymer matrix, wherein the electron-accepting molecule is benzene with two $NO_2$ moieties, and wherein the electron-donating polymer matrix is poly(2,5-dimethoxy-1,4-phenylene vinylene (DMPPV).

19. The metamaterial as defined in claim 14 wherein the non-linear organic material is the electron-accepting molecule in the electron-donating polymer matrix, wherein the electron-accepting molecule is p-chloranile, and wherein the electron-donating polymer matrix is poly(N-vinylcarbazole) (PVK).

20. The metamaterial as defined in claim 14 wherein the non-linear organic material is the electron-accepting molecule in the electron-donating polymer matrix, wherein the electron-accepting molecule is 2,4,7-trinitrofluorenone, and wherein the electron-donating polymer matrix is poly(N-vinylcarbazole) (PVK).

* * * * *

UNITED STATES PATENT AND TRADEMARK OFFICE
CERTIFICATE OF CORRECTION

PATENT NO. : 8,017,239 B2
APPLICATION NO. : 11/395698
DATED : September 13, 2011
INVENTOR(S) : Alexandre M. Bratkovski et al.

Page 1 of 1

It is certified that error appears in the above-identified patent and that said Letters Patent is hereby corrected as shown below:

In column 8, line 7, in Claim 8, after "the" delete "at least one of the".

Signed and Sealed this
Nineteenth Day of June, 2012

David J. Kappos
*Director of the United States Patent and Trademark Office*